Nov. 1, 1949 R. G. ROWE 2,486,984
VIBRATION APPARATUS FOR TESTING ARTICLES
Filed May 7, 1943 2 Sheets-Sheet 1

INVENTOR
ROBERT G. ROWE
BY
ATTORNEY

INVENTOR
ROBERT G. ROWE
BY W. Poley
ATTORNEY

Patented Nov. 1, 1949

2,486,984

UNITED STATES PATENT OFFICE 2,486,984

VIBRATION APPARATUS FOR TESTING ARTICLES

Robert G. Rowe, Niagara Falls, N. Y., assignor to The Carborundum Company, Niagara Falls, N. Y., a corporation of Delaware Application May 7, 1943, Serial No. 486,029

5 Claims. (Cl. 73—67)

This invention relates to an apparatus for testing the vibration characteristics of bodies, particularly bodies made of bonded granular material, whereby mechanical properties and characteristics of the bodies may be determined. The invention has utility in the testing of ceramic bonded articles such as bonded tiles, bricks, and the like, and may be used to advantage in the testing of bonded abrasive articles such as wheels, sticks, and similar articles. By use of such apparatus the grade of bonded abrasive articles may be quickly and accurately determined. Further objects will be apparent as the description proceeds.

The characteristics of articles made of bonded granular material depend on a variety of factors, of which probably the most important are: (1) the bonding materials; (2) the degree of maturation of the bond; (3) the proportions of bond and granular material; and (4) the relative proportions of the amounts of the granular materials of various sizes.

Because of the effects of these and other variables on the properties of the finished product, considerable care and skill are required in the manufacture of an article consisting of bonded granular material in order that the product shall be such that it is best suited for the purpose intended. The same variations occur in bonded abrasive articles and are caused principally by the same four factors as those given above. It is desirable in general that the properties of bonded abrasive articles, such as the "toughness" or "grade," shall be known in order that the abrasive product may be used in the application or applications where it has the desired cutting action, that is, so that the right abrasive article shall be used for the job in hand.

Even though great care is exercised in attempting to use identical bonding materials, methods of curing, proportions of bond and granular abrasive and the same relative proportions of the amounts of abrasive grains of various sizes, bonded abrasive wheels or other bonded abrasive articles made at the same time and fired in the same kiln frequently are found to differ markedly as to toughness or grade. For this reason such bonded abrasive articles after finishing are conventionally tested to determine their grade.

One of the first grading methods consisted of using a tool somewhat like a chisel or screw driver to pry one or more abrasive granules out of the bonded abrasive article. A more refined adaptation of such method consisted of subjecting the abrasive article to the action of a tool which struck it with a predetermined number of impacts of predetermined severity, and then measuring the amount to which the impacting tool had penetrated the body. A further method consisted of subjecting the body to a V-pointed penetrating tool forced into it by a known pressure. Here again the amount of penetration was taken as an indication of the toughness or grade of the article. It has also been proposed to measure the depth of depression in the article by a sandblasting machine which blows a fixed amount of abrasive against the wheel through an orifice of known diameter fixed a constant distance from the wheel surface and under a constant pressure of air which projects the abrasive particles against the wheel.

All the above prior art methods of determining the toughness or grade of articles made of bonded granular material are relatively slow and costly, and in the factory have sometimes proved to be bottlenecks. Furthermore, all these methods work by prying or chipping granules from the bonded articles and thus the finished tested article is defaced.

I have found that the natural frequencies of vibration of identically dimensioned articles made of bonded granular material have the same relationship to each other as do the grades assigned to them by prior art methods of grading, such as, for instance, the impact grading discussed above. In other words, if a group of such articles which have been previously graded by known methods are tested to determine their natural frequencies of vibration when vibrating in identical modes, such frequencies will lie in the same order as the grades determined by known methods and will have the same relative positions with respect to each other. Thus by determining the natural frequencies of articles made of bonded granular material when such articles are vibrating in a known mode, the relative grades of such articles may be found. By the term "mode of vibration" is meant the pattern in which the article is vibrating. Different articles vibrating in identical modes have the same number of nodes of vibration and the same number of antinodes.

The apparatus of the present invention, operating as it does merely by subjecting the article to be tested to sonic vibrations, does not in the slightest deface the article. The apparatus is accurate and simple to operate; it is fast, in production grading the test on any individual article not necessarily exceeding from 10 to 15 seconds. It has been found that by use of the apparatus, one operator can test at least ten times as many articles in a day as he could by prior art testing machines employing the principle of impacting the article as set out above.

I have found that in articles made of bonded granular material, particularly ceramic bonded articles of this type, the natural period for a particular mode of vibration of such articles, all other factors such as size, type of bond and relative amounts of bond and granular material being the same, varies in accordance with the toughness or grade of the article. For any grade of such articles, all other factors remaining the same, as explained above, the natural frequency will lie between fixed narrow limits. When such range of frequencies is determined for a given article which has a certain desired grade, it can easily be determined, by use of my apparatus, whether other similar bonded articles have the same grade merely by determining their natural frequencies of vibration.

It is apparent that my apparatus has wide utility, whether in the testing of a series of similar bonded granular articles or in the testing of individual articles of this type. As evidence of the latter, the detection of flaws in individual articles is cited. It is often possible, by use of my invention, to detect hair cracks and internal flaws in articles made of bonded granular materials which otherwise would not ordinarily be detected.

The invention will be more readily comprehended by reference to the accompanying drawings, which it is to be understood are for illustrative purposes only.

Figure 1:
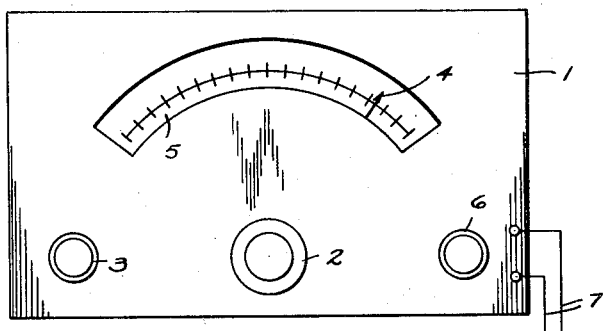
Figure 1 is a view in elevation of the apparatus of the present invention, some of the apparatus being shown schematically.
Figure 4:
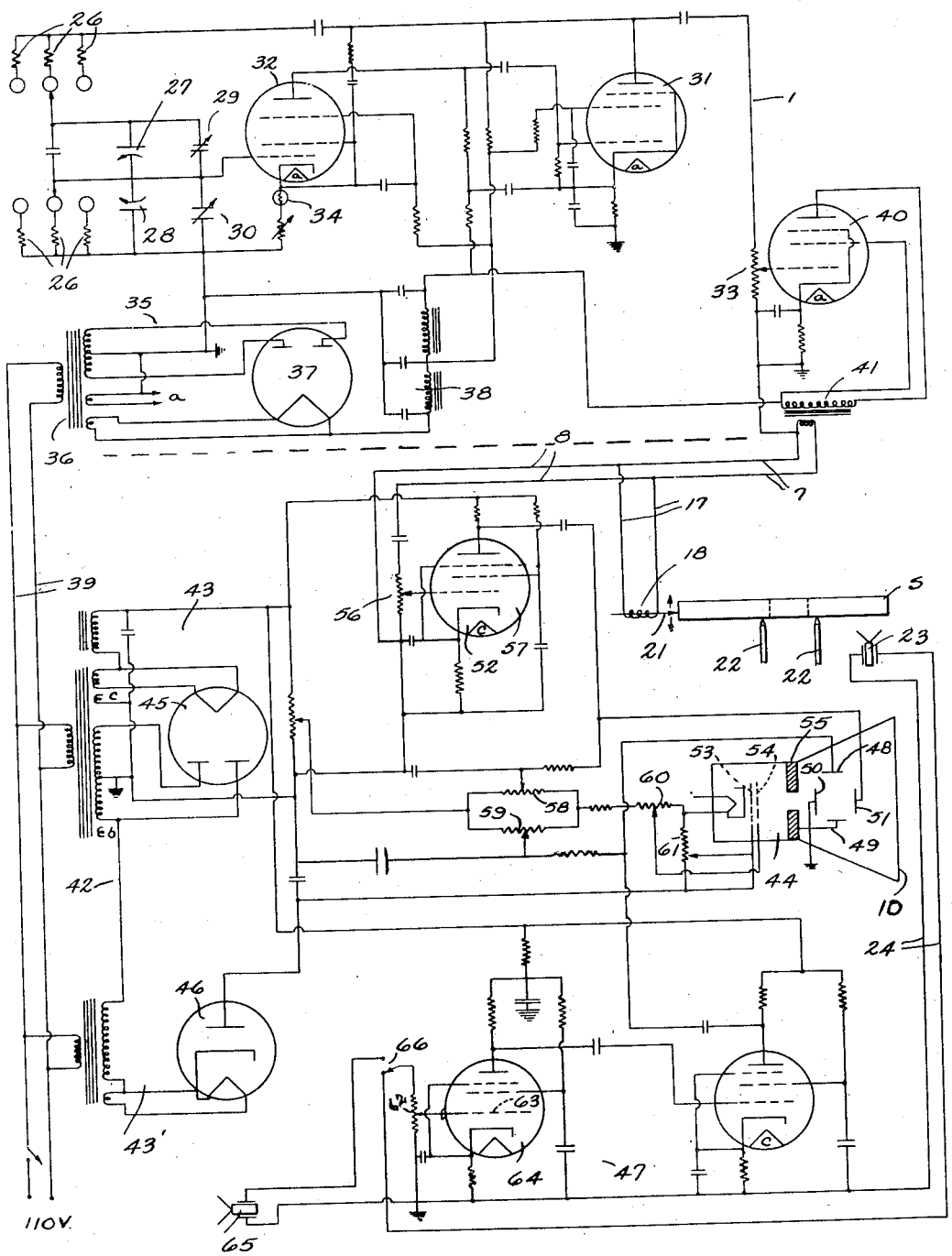
Figure 4 is a circuit diagram for the apparatus shown in Figure 1.

In Figure 1 there is shown an apparatus which has proved to be particularly useful and advantageous. As it is shown, the apparatus consists of an audio oscillator unit designated generally by the reference character 1. Such oscillator, which is designed to give a voltage of substantially constant amplitude over its entire frequency range, is provided with a tuning dial 2 which allows it to be adjusted to deliver a voltage of any desired frequency within a given range as determined by the adjustment of range selector dial 3 which in the embodiment shown in Figure 4 gives a choice of any one of three frequency bands. In one modification of the apparatus the audio oscillator is capable of producing voltage of frequencies between 20 and 20,000 cycles per second. Movable pointer 4 cooperates with stationary scale 5 to indicate the frequency of voltage delivered by the audio oscillator within the band chosen by dial 3. There is also provided a dial 6 for varying the amount of power delivered by the oscillator. The various components of the audio oscillator are well known in the electronic art, so that no further description of them need be given here. A complete wiring diagram of such audio oscillator in addition to the other parts of the complete apparatus is given in Figure 4.

The output from the audio oscillator is delivered to lead wires 7. To such lead wires are connected other wires 8 which lead to a combined amplifier and oscillograph unit designated in general by the reference character 9. The amplifier-oscillograph unit 9 is provided on the front panel thereof with a screen 10 on which the pattern of the cathode ray tube is projected. Unit 9 has also on the front panel thereof a dial 11 which provides for the adjustment of horizontal amplitude of the pattern on the screen 10, a dial 12 which provides for the horizontal positioning of the pattern on the screen 10, and a dial 13 which allows the cathode ray beam to be brought into focus on screen 10. On the right hand side of the panel of unit 9, as shown in Figure 1, there is provided a dial 14 which allows for the variation in intensity of the cathode ray beam projected on screen 10, a dial 15 which allows variation in the vertical positioning of the pattern on screen 10 of the oscillograph, and a knob 16 which allows variation in the vertical amplitude of the pattern projected on screen 10. By proper manipulation of the six control dials on unit 9 the pattern on the oscillograph screen may be centered both horizontally and vertically, may be given the desired intensity, brought into proper focus, and may have the relative horizontal and vertical amplitudes varied as desired. Such features are common in the oscillograph art and need not be further explained here. However, as in the case of the audio oscillator, the entire wiring diagram of the amplifier and the oscillograph are given in Figure 4.

Figure 2:
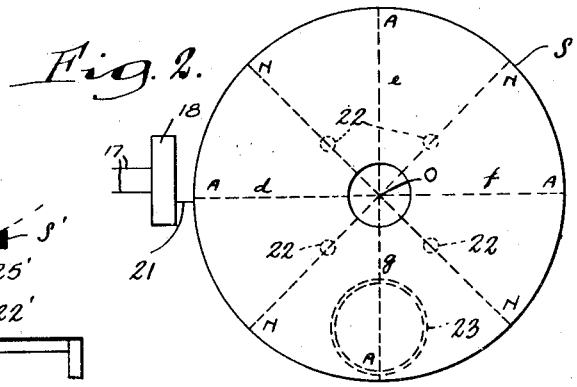
Figure 2 is a plan view of an abrasive wheel being tested and shows relative positions of wheel supports, vibrating stylus and microphone.

Lead wires 7 from the audio oscillator are further connected to lead wires 17 which feed an electrical vibrating device 18, which may be conveniently in the form of a recording head such as that used for making lateral cut phonograph records. The vibrating means 18 is supported from table 19 by means such as a vertical rod shown at 20. Attached to the vibrating means 18 is a stylus 21 which may be in the nature of a phonograph needle. Stylus 21 vibrates in a vertical plane in a direction parallel with the axis of the wheel, as shown by the arrows in Figure 1. Adjacent to vibrating means 18, and spaced in a manner that will be explained in connection with Figure 2, are means 22 for supporting the specimen to be tested. The specimen is designated by the reference character S. Supported from table 19 in such relationship to supports 22 that it lies close to but out of contact with specimen S, is a microphone 23 for picking up or detecting the vibrations in the specimen. Lead wires 24 from such microphone are connected to the amplifier-oscillograph unit in the manner shown in Figures 1 and 4.

When circular specimens such as grinding wheels are tested by the method and apparatus herein disclosed it is preferred that the wheel supports 22 be located in the manner shown in Figure 2. In such case four supports 22 are employed, each support being located on nodal radii, that is, radii along which the vibration when the body vibrates in the preferred mode is of substantially zero amplitude. Starting with the stylus contacting position on the wheel, which is denoted 0 degrees, the first support 22 will be located on a radius N—0 which is at an angle of 45° to the line between the wheel center and the point of stylus contact. The next support 22 will then be located at an angle of 135° from the point of stylus contact, the third support will be located at an angle of 225° from such point, and the fourth support will be located at an angle of 315° from the point of stylus contact. In the fundamental mode of vibration which we usually prefer to employ in determining the natural frequency of circular articles there are, as has been explained, four nodal radii. This means that the circular article vibrates in four sectors, designated $d$, $e$, $f$ and $g$ in Figure 2, and that the radius A—0 lying midway between the nodal radii of each sector will vibrate with a maximum amplitude. In other words the antinodes are located midway between the nodal radii. If, at any instant, the antinodal radius of sector $d$ is at a position of maximum displacement in the direction downwardly into the paper in Figure 2, the antinodal radius of sector $f$ will likewise be at a maximum displacement downwardly. The antinodal radii of sectors $e$ and $g$ will then be at their maximum displacement upwardly. It is obvious that microphone 23 employed for detecting and transmitting vibrations in the body S will usually be placed near the antinodal radii of the specimen in order to yield a maximum output. Although the microphone is shown in Figure 2 as being placed beneath sector $g$ of the article, it is obvious that it may be placed either above or below the specimen, and in any one of the four sectors $d$, $e$, $f$, and $g$.

Since the wheel rests on the supports at points of minimum vibration, the supports damp the vibration in the body little if at all, when the nodes correspond to the location of the supports. Supports 22 are preferably made with top portions 25 of material such as rubber or felt to further prevent damping of the vibrations.

Whereas there have been shown four supports 22 in the apparatus illustrated, because the mode of vibration which we prefer to create in the circular body has four antinodes, it will be understood that if another mode of vibration is desired the number of supports may be varied accordingly, and the location of the supports so determined that they coincide with the locations of the diametric or circular nodes in the body.

Figure 3:
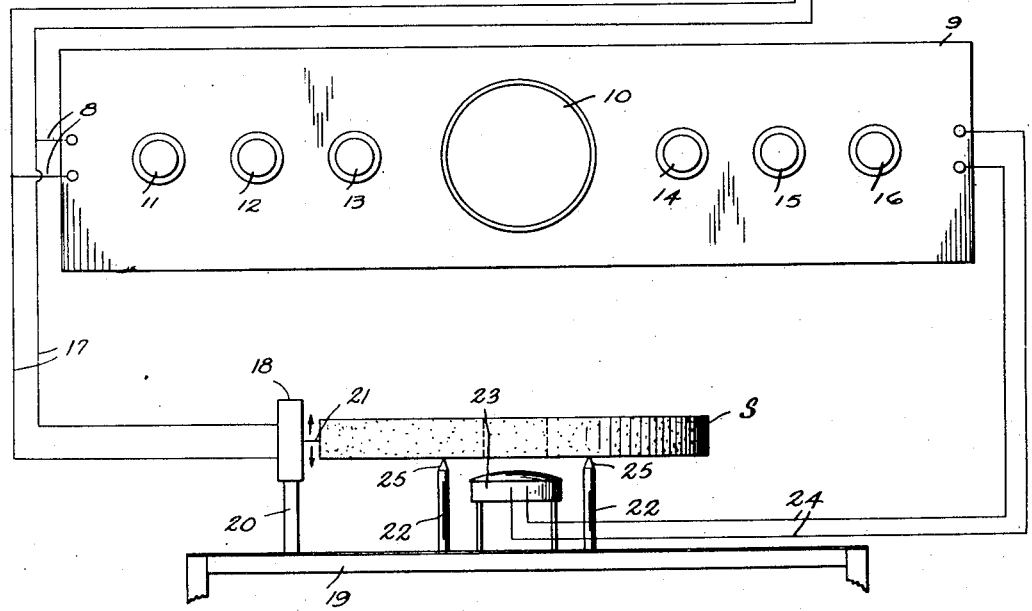
Figure 3 shows in elevation, part of the apparatus being shown schematically, means for testing articles other than abrasive wheels.
Figure 3:
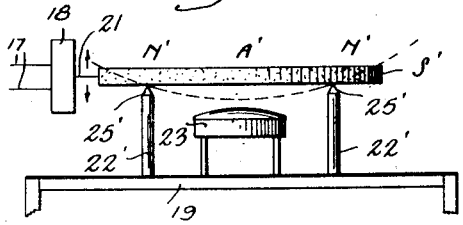

It is to be understood that the apparatus of the invention herein disclosed is not confined to use with bodies circular in shape, but that it may be employed with bodies made of bonded granular material of any shape whatsoever. Obviously it may be necessary when various different shapes of bodies are tested to employ different specimen supporting means from those shown in Figure 2. As an example only, there is shown in Figure 3 apparatus for the testing of elongated shapes such as bars or rods. In that figure, bar S' is shown resting upon two supports 22' having top portions 25'. These top portions 25' are elongated in a direction perpendicular to the paper, are brought to a sharp upper edge, and are preferably composed of such material as rubber, whereby they do not unduly damp the vibrations in the specimen. In order to allow the accommodation of specimens of different lengths, supports 22' are made adjustable in directions toward and away from each other. Since such adjusting apparatus may be merely such conventional means as right or left hand screws or the like, it is not shown in Figure 3.

In testing a body such as that shown in Figure 3 it has been found convenient to place the vibrating means 18 with its stylus 21 in such position that it contacts the end of the specimen. A mode of vibration in such bodies in which resonance between driver and load is easy to detect is one in which the bar vibrates with one antinode A' at a point midway of its length, as indicated in dotted lines and the specimen in Figure 3, and two antinodes at .224 L from each end, where L is the length of the specimen. It is preferable, as in the case of a wheel, to position supports 22' at nodes N', that is, points of minimum or zero displacement of the body. Microphone 23 is positioned under the middle of the specimen, close to it but out of contact with it. In other respects the arrangement of the parts and electrical connections are the same as those shown in Figures 1 and 4.

The apparatus may be used in the testing of a series of similar articles, such as ceramic bonded granular material as follows. Several wheels, for instance, are tested by such means as an impact grader in order to determine a standard grade for that particular run of wheels. Such article or articles are then tested by the sonic grading method of the present invention in order to determine into what range of frequencies a natural frequency of each of the other as yet not tested wheels must fall in order that they may conform to the standard. Having thus determined the standard for any one batch of wheels, the remaining wheels may be tested by the sonic grading method in a rapid and accurate manner. Wheels which have natural frequencies outside the predetermined range of frequency for the standard are not necessarily useless but may fall within another grade and thus be useful in other applications. If, however, an identically dimensioned wheel has a natural frequency which is very much different from others in the same batch, the operator is warned that such a wheel may have internal flaws or cracks and thus in operation might be dangerous.

Another method of grading a group of supposedly similar articles such as bonded abrasive wheels consists in determining the natural frequency of each of the wheels in the group, for a particular preferred mode of vibration. The wheels are then arranged in groups corresponding to their frequencies. Several of the wheels in the group having the lowest frequency and several of the wheels having the highest frequency are then tested for grade by the impact or other known grading method. In addition it may be desirable, if the spread between the highest and lowest frequency is found fairly large, to grade several articles having frequencies lying in the middle of the range by the impact or the known method. Then, since the natural frequency of each wheel is known, it will be known how each wheel falls in the group and its grade can readily be determined.

The above two examples of the uses to which my apparatus may be put are illustrative only. It is obvious that the apparatus of my invention has utility in determining the natural period of vibration or frequency of a wide variety of bodies for purposes other than determining their grade. For instance, the degree to which powder metal shapes or powder metal bonded abrasives have been sintered may be determined by subjecting such articles to vibration in the device of the present invention. The natural frequency of such articles gives an accurate measurement of the degree to which the powder metal has sintered or matured.

In the wiring diagram shown in Figure 4 the audio oscillator is shown in general as entirely above the dotted line and the oscillograph, amplifier, vibrating means 18, and microphone 23 are shown entirely below the dotted line. The audio oscillator shown in the wiring diagram in Figure 4 utilizes a Wien bridge resistance capacity tuned circuit to generate the audio voltage at its fundamental frequency. This circuit comprises six frequency determining resistors 26, each pair of which may be selectively switched into the circuit as indicated to provide coverage in three bands of frequencies of the entire range of frequency of which the oscillator is capable. Two variable condensors 27 and 28 provide logarithmic frequency coverage of each of the three bands. The two padding condensors 29 and 30 are employed for the purpose of alignment and frequency correction.

In the oscillator, positive feed back is introduced from the plate circuit of pentode tube 31 to the grid circuit of pentode tube 32 to maintain oscillation. Negative feed back is introduced into the cathode circuit of the pentode tube 32 to provide wave form correction and amplitude control of the oscillations. Power control of the audio oscillator is provided, as explained in connection with Figure 1, by dial 6. This dial operates the potentiometer 33. The circuit is made self-compensating, that is, the output voltage remains practically constant throughout a wide range of input line voltage by reason of the provision of the ballast lamp 34 which controls the feed back factor and also provides amplitude control of the generated signal throughout the audio range.

The power supply for the audio oscillator consists of a full wave rectifier circuit indicated by the reference character 35. The power supply consists generally of a power transformer 36, a full wave rectifier tube 37, and a filter circuit 38. As shown, transformer 36 has a winding with leads marked "a" for supplying the filaments of tubes 31, 32 and 40. The input to the power supply is through wires 39, which are connected to a source of 110 volt alternating current. Filter circuit 38 is connected at the output of the power supply circuit and provides a D. C. voltage with low ripple content.

Pentode tube 40 is used as an audio amplifier working into the output transformer 41 which provides the proper reflected load from the vibrating means 18 for the plate of tube 40.

The amplifier and oscillograph unit, shown below the dotted line in Figure 4, includes a power supply circuit 42. Such power circuit comprises a circuit 43 for supplying a full wave rectified low voltage for the amplifier tubes, and a circuit 43' which in conjunction with circuit 43 provides half wave rectified high voltage to supply the high D. C. potential for the cathode ray tube 44 of the oscillograph. Tube 45, in circuit 43, is a full wave rectifier tube, and tube 46, in circuit 43', is a half wave rectifier tube.

The amplifier indicated in general by the reference character 47 consists of a two-stage high gain audio amplifier of uniform frequency characteristics which provides a fairly constant output voltage over the entire audio range. The output from such amplifier is connected to vertical deflection plate 48 of the cathode ray oscillograph tube 44. The other vertical deflection plate 49 is connected to ground.

Of the two corresponding horizontal deflection plates in cathode ray tube 44, plate 50 is connected to ground, and plate 51 is connected to the output of transformer 41 through amplifier tube 52. The electric field between plates 48 and 49 of cathode ray tube 44 thus varies in accordance with the voltage produced by microphone 23 as amplified by amplifier 47, and the electric field between plates 50 and 51 of the cathode ray tube 44 varies in accordance with the oscillator voltage as modified by amplifier tube 52. Thus the resultant field between the horizontal deflection plates of tube 44 alternates with the same frequency as the alternating voltage produced by the oscillator 1, which in turn is the same frequency as that with which stylus 21 vibrates. The resultant field between the vertical deflection plates of tube 44 alternates with the same frequency as that of the voltage delivered by microphone 23.

A beam of cathode rays emitted by the cathode of tube 44 passes through grid 53 and anode 54 in that order, through grounded anode 55 having a hole in the center thereof, and impinges on screen 10. The point of impingement of the cathode ray beam on screen 10 at any instant is determined by the instantaneous resultant of the electric fields between the sets of vertical and horizontal deflection plates. The pattern traced on the screen by the beam thus affords an easy method of comparing the frequency with which stylus 21 is vibrating with the frequency with which specimen S is vibrating, as detected by the microphone 23 when the amplitude of specimen S becomes relatively large. When the two dynamic voltages applied to the deflection plates coincide as to frequency and are of similar magnitude, an elliptical pattern forms on screen 10 which can be more accurately tuned to a straight line. The shape of this pattern is affected by the amplitude and phase relationship of the two alternating fields, but in practice any slight phase or amplitude difference does not adversely affect the accuracy of the apparatus.

The various dials 11–16, incl., shown in Figure 1 on the front panel of amplifier-oscillograph unit 9 are connected, in the hook-up shown in Figure 4, in the following manner. Horizontal amplitude adjusting dial 11 is connected to potentiometer 56 to vary the signal voltage applied to grid 57 of tube 52. Horizontal positioning dial 12 is connected to potentiometer 58, to control the static charge on plate 51 and vertical positioning dial 15 is connected to potentiometer 59 to control the static charge on plate 48. Focusing dial 13 is connected to potentiometer 60 for varying the potential of anode 54 in cathode ray tube 44. Dial 14 for adjusting the intensity of the cathode ray beam is connected to potentiometer 61 for varying the potential of grid 53 in tube 44. Vertical amplitude adjusting dial 16 is connected to potentiometer 62 for varying the signal voltage applied to grid 63 of amplifier tube 64.

As shown in Figure 4, a second microphone 65 may be selectively connected to the amplifier 47 in place of the microphone 23 by switching means such as that shown at 66. Microphone 65 is connected by a long enough cord to the apparatus so that it may be moved about the vibrating specimen to various locations as an aid in quickly determining nodes and antinodes of vibration and thus in ascertaining the mode in which the specimen may be vibrating.

It will be apparent that when the period of the driving stylus coincides with a natural period of vibration of the body being tested, that is, when the driver and the load are in resonance, the mechanical impedance offered to the stylus by the load is at a minimum. At resonance, for a given input voltage at the stylus vibrating means, the amplitude of vibration of the body reaches a maximum, and hence the voltage output of the adjacent microphone reaches a maximum. As has been explained, in usual practice it is preferred that the natural frequency determined shall be that of a simple mode of vibration with relatively large amplitude. To reduce the possibility of detecting spurious patterns on the oscillograph resulting from resonance in more complex modes of vibration of the body, the power delivered to the stylus vibrating means and the vertical amplifier gain are so correlated as to emphasize the pattern resulting when the body resonates in the simple preferred mode of vibration. Although the term "relatively large amplitude of vibration" has been used, it should be understood that the amplitude of vibration of the stylus is actually quite small, that is, in the order of thousandths of an inch, and that it is usually only at resonance that the vibration of the body may be detected as by putting one's finger on such vibrating body.

As has been explained before, when the specimen S or S' is driven by stylus 21 in such manner as to vibrate at its natural frequency, the vertical amplitude of the pattern on screen 9 of the oscillograph becomes large. This pattern is of such character as to indicate that the fields between the horizontal and vertical plates of the cathode ray tube are alternating at the same frequency, which, in turn, means that the frequency of the stylus is the same as the frequency of vibration of the specimen. A reading taken on calibrated scale 5 of the audio oscillator as indicated by tuning pointer 4, when such is the case, gives the natural period of vibration or frequency of the specimen directly.

Although the apparatus of the present invention has been specifically discussed in connection with the testing of a series of circular articles substantially identical in diameter, thickness, and diameter of arbor hole, my invention is not limited to the comparing of such similar articles. Simple known corrections may be made, for instance for variations in all of these three factors, that is, wheel thickness, wheel diameter, and arbor hole diameter. It has been found, all other factors remaining the same, that the natural frequency of a circular disc-shaped article made of bonded granular material varies directly as the thickness thereof. Thus, two articles supposedly identical except for the difference in thickness may be readily compared by allowing for the change in frequency due to the change in thickness. It has also been found that where the diameter of the wheel only is varied, all other factors remaining the same, the natural frequency of the bodies is proportional to $$\frac{1}{d^2}$$

where $d$ is the diameter of the wheel. It is further known that where the diameter of the arbor hole is the only factor changed, the other factors remaining constant, the natural frequency of the wheel is proportional to $$1 - \left(\frac{a}{d}\right)2$$

where $a$ is the arbor hole diameter, and $d$ the diameter of the wheel. Knowing such relations between frequencies and wheel thickness, diameter, and arbor hole diameter, direct comparison between wheels in which one or more of these factors are different may be made.

Obviously, adjustments may also be made when comparing the natural frequencies of articles of shapes other than discs or annuli. Merely by the application of known formulae a direct comparison may be made between the natural frequencies of bodies somewhat similar in shape but differing as to length, width, thickness, or all three of these factors.

The device of the present invention is advantageous, in addition to the reasons hereinabove pointed out, because the manner of driving and supporting the specimen and the manner in which the vibrations are detected have little if any effect upon the frequency of its vibration. The stylus 21 has little mass and contacts the specimen only lightly. At the natural frequency of the specimen, since the stylus and specimen are then vibrating at the same frequency, no error is introduced into the reading by reason of the contact of the driving stylus with the specimen. The microphone for detecting and transmitting the vibrations of the specimen is entirely out of contact with it, and so introduces no such errors into the system as would occur if such detecting means were fastened to the specimen. In such case the mass and shape of the vibrating body and consequently its natural frequency would be changed, if the detecting means were carried by the specimen; or the vibrations in the specimen would be seriously damped and might be changed as to mode if the vibration detecting means were carried by a separate support but was pressed against the specimen.

Although my apparatus has been specifically described, for purposes of illustration, as being used in the testing of articles made of bonded granular material, particularly bonded abrasives, it is obvious that it also finds utility in the testing of bodies of wide variety of other kinds of materials such as cast or forged metal and sintered or cast refractories. The nature and scope of the present invention having been indicated and the preferred embodiment of the invention and the method of practicing it having been specifically described, what is claimed as new is:

1. Apparatus for determining the natural frequency of vibration of a body, comprising means for supporting the body in locations at or near the nodes of a preferred simple mode of vibration of the body, an audio oscillator adjustable to give voltages of frequencies varying within an appreciable range, means driven by the audio oscillator, said means comprising an electric vibrating means and a stylus carried thereby adapted to contact and force said body into vibrating, means for positioning said electric vibrating means in such relation to the body that the stylus is aligned substantially along the direction of a long dimension of the body and so that it vibrates in a direction transverse to the length of the body, vibration detecting and transmitting means located adjacent to, but out of contact with the body substantially at a location of an antinode of the preferred mode of vibration of the body, an audio frequency amplifier connected to the output of the vibration detecting and transmitting means, and an oscilloscope, one set of plates of the oscilloscope being fed by the audio oscillator and in parallel with the electric vibrating means, and the other set of plates of the oscilloscope being fed by the output from the audio frequency amplifier whereby the frequency of the signal emitted by the audio oscillator may be continuously and instantaneously compared with the resultant frequency of vibration of the body.

2. Apparatus for determining the natural frequency of vibration of abrasive wheels and the like comprising means for supporting said abrasive wheel, said supporting means contacting one face of the wheel at points spaced 90° from each other, means for applying vibrations within the audio frequency range to the edge of the wheel on a radius lying substantially midway between adjacent wheel supports, said vibration applying means comprising a stylus contacting the wheel and vibrating in a direction coaxial of the wheel, vibration detecting and transmitting means adjacent to but out of contact with the wheel and located at a position on a radius of the wheel substantially midway between two adjacent wheel supports, means to indicate the frequency of vibration applied to the grinding wheel, and means for indicating when the resultant frequency of vibration of the grinding wheel is the same as that of the stylus.

3. Apparatus for determining the natural frequency of vibration of a body comprising an audio oscillator, means to adjust said oscillator over an appreciable frequency range, means driven by the audio oscillator and including an electrical vibrating means touching, but not connected to, the body for vibrating the body, vibration detecting and transmitting means placed close to but out of contact with the body substantially at a location of an antinode of the preferred mode of vibration of the body, said vibration detecting means changing the received vibrations into electrical impulses, and means for continuously and instantaneously comparing the frequency of vibration of the body with the frequency of vibration of the audio oscillator over the entire range of adjustment of the frequency of the oscillator, said means comprising an oscilloscope to one set of plates of which is fed the electrical output of the vibration detecting means, and to another set of plates of which is fed a portion of the output of the audio oscillator.

4. Apparatus for determining the natural frequency of vibration of a body comprising an audio oscillator, means to adjust said oscillator over an appreciable frequency range, means driven by the audio oscillator and including an electrical vibrating means touching, but not connected to, the body for vibrating the body, vibration detecting and transmitting means placed close to but out of contact with the body substantially at the location of an antinode of the preferred mode of vibration of the body, an audio frequency amplifier connected to the output of the vibration detecting and transmitting means, and an oscilloscope, one set of plates of the oscilloscope being fed by the audio oscillator and another set of plates of the oscilloscope being fed by the output from the audio frequency amplifier, whereby the frequency of the signal emitted by the audio oscillator may be continuously and instantaneously compared with the resultant frequency of vibration of the body over the entire range of adjustment of the frequency of the oscillator.

5. Apparatus for testing bodies of material of elastic character whereby to determine physical characteristics thereof, comprising, means supporting such a body for a preferred mode of vibrations, electric oscillator means for generating vibrations of frequencies varying over an appreciable range, electro magnetic driving means arranged so as to respond distinctively to the generated vibrations and positioned to touch and subject the body to the generated vibrations in accordance with said preferred mode, and means connected to the oscillator, and adjacent to, but out of contact with, the body, to simultaneously and continuously respond to the generated vibrations and to the vibrations of the body so as to simultaneously and continuously produce a vibration resultant two dimensional picture which varies distinctively with the frequency of the generated vibrations and in a readily determinable fixed order, from any existing generated frequency to a particular predetermined generated frequency, whereby to indicate the direction toward, and the distance from, said particular predetermined generated frequency, of any then existing generated frequency.

ROBERT G. ROWE.

REFERENCES CITED

The following references are of record in the file of this patent:

UNITED STATES PATENTS

| Number | Name | Date |
| --- | --- | --- |
| 1,414,077 | Fessenden | Apr. 25, 1922 |
| 1,502,903 | Campbell | July 29, 1924 |
| 1,543,124 | Ricker | June 23, 1925 |
| 1,635,787 | Hort | July 12, 1927 |
| 2,178,252 | Forster | Oct. 31, 1939 |
| 2,208,648 | Schrader | July 23, 1940 |
| 2,306,137 | Pabst et al. | Dec. 22, 1942 |